United States Patent [19]

Satou et al.

[11] Patent Number: 5,802,254
[45] Date of Patent: Sep. 1, 1998

[54] DATA ANALYSIS APPARATUS

[75] Inventors: Yoshinori Satou; Akira Maeda; Hideyuki Maki, all of Yokohama; Katsumi Omori, Hitachi, all of Japan

[73] Assignee: Hitachi, Ltd., Tokyo, Japan

[21] Appl. No.: 684,392

[22] Filed: Jul. 19, 1996

[51] Int. Cl.⁶ .................................................. G06F 15/18
[52] U.S. Cl. ........................................ 395/68; 395/76
[58] Field of Search ...................................... 395/68, 76

[56] References Cited

U.S. PATENT DOCUMENTS 5,544,281  8/1996  Maruoka et al. .................... 395/68
5,701,400  12/1997  Amado ................................ 395/76

*Primary Examiner*—Krisna Lim
*Attorney, Agent, or Firm*—Fay, Sharpe, Beall, Fagan, Minnich & McKee

[57] ABSTRACT

To analyze symbolized time series data in units of a case and extract a causal relation included in the data as a rule representing a data structure, time series data are stored as records of a symbol and a time by a symbolized data management apparatus, and a unit of description of an analysis is determined by a case production apparatus and a classification apparatus. A model extraction apparatus extracts a data structure included in a class by case and outputs the extracted data structure as a rule. Analysis results are output as a temporal relationship between a case and a rule, indicating a conformity degree between cases, by the symbolized data management apparatus.

18 Claims, 13 Drawing Sheets

| SYMBOL VALUE | VARIATION PATTERN |
|---|---|
| BEGINS TO RISE | |
| DROPS AND RISES | |
| BEGINS TO DROP | |
| RISES | |
| DROPS | |

FIG. 3

| TIME | SYMBOL VALUE | SIMILARITY DEGREE |
|---|---|---|
| 0-50 | RISES AND DROPS | 0.4 |
| 200-250 | BEGINS TO RISE | 0.8 |
| 250-400 | RISES | 0.9 |
| 400-450 | BEGINS TO DROP | 0.7 |
| | | |

| TIME | SYMBOL VALUE | SIMILARITY DEGREE |
|---|---|---|
| 100-150 | PRESSURE RISES | 0.8 |
| 200-230 | PRESSURE BEGINS TO RISE | 0.6 |
| 300-350 | PRESSURE RISES AND DROPS | 0.9 |
| 350-400 | PRESSURE BEGINS TO DROP | 0.7 |
| | | |

702

| TIME | SYMBOL VALUE | SIMILARITY DEGREE |
|---|---|---|
| 120-170 | TEMPERATURE RISES | 0.6 |
| 280-320 | TEMPERATURE BEGINS TO RISE | 0.9 |
| 320-400 | TEMPERATURE RISES AND DROPS | 0.3 |
| 400-450 | TEMPERATURE BEGINS TO DROP | 0.7 |
| | | |

703

| TIME | SYMBOL VALUE | SIMILARITY DEGREE |
|---|---|---|
| 0-50 | FLOW RATE RISES | 0.7 |
| 50-80 | FLOW RATE BEGINS TO RISE | 0.5 |
| 200-300 | FLOW RATE RISES AND DROPS | 0.8 |
| 300-350 | FLOW RATE BEGINS TO DROP | 0.9 |
| | | |

| CONDITION | CONCLUSION |
|---|---|
| IF TEMPERATURE RISES WITHIN ONE MINUTE | THEN ABNORMAL CONDITION HAS OCCURRED |
| IF TEMPERATURE RISES AND DROPS AND PRESSURE RISES WITHIN ONE MINUTE | THEN ABNORMAL CONDITION HAS OCCURRED |
| IF FLOW RATE BEGINS TO DROP AND PRESSURE RISES WITHIN ONE MINUTE | THEN ABNORMAL CONDITION HAS OCCURRED |

| DEFINITION OF CASE | FOR ONE MINUTE PRIOR TO OCCURRENCE OF ABNORMAL CONDITION |
|---|---|
| DEFINITION OF CLASS | CASE AGGREGATE UPON OCCURRENCE OF ABNORMAL CONDITION |
| NUMBER OF RULES | 5 |

FIG. 12(b)

| RULE NUMBER | CONDITION | COVER RATIO | ACCURACY | AVERAGE SIMILARITY DEGREE | EVALUATED VALUE |
|---|---|---|---|---|---|
| 1 | TEMPERATURE RISES | 0.3 | 0.8 | 0.7 | 0.9 |
| 2 | TEMPERATURE RISES AND DROPS, PRESSURE RISES | 0.3 | 0.6 | 0.8 | 0.8 |
| 3 | FLOW RATE BEGINS TO DROP PRESSURE DROPS | 0.2 | 0.85 | 0.6 | 0.7 |
| 4 | TEMPERATURE BEGINS TO DROP PRESSURE DROPS | 0.1 | 0.8 | 0.5 | 0.6 |
| 5 | FLOW RATE DROPS PRESSURE DROPS | 0.1 | 0.8 | 0.4 | 0.55 |

| RULE NUMBER | CONDITION | CONCLUSION |
|---|---|---|
| RULE 1 | IF TEMPERATURE RISES WITHIN ONE MINUTE | THEN ABNORMAL CONDITION HAS OCCURRED |
| RULE 2 | IF TEMPERATURE RISES AND DROPS AND PRESSURE RISES WITHIN ONE MINUTE | THEN ABNORMAL CONDITION HAS OCCURRED |
| RULE 3 | IF FLOW RATE BEGINS TO DROP AND PRESSURE DROPS WITHIN ONE MINUTE | THEN ABNORMAL CONDITION HAS OCCURRED |
| RULE 4 | IF TEMPERATURE BEGINS TO DROP AND PRESSURE DROPS WITHIN ONE MINUTE | THEN ABNORMAL CONDITION HAS OCCURRED |
| RULE 5 | IF FLOW RATE DROPS AND PRESSURE DROPS WITHIN ONE MINUTE | THEN ABNORMAL CONDITION HAS OCCURRED |

*FIG. 13*

DATA ANALYSIS APPARATUS

BACKGROUND OF THE INVENTION

1. Field of the Invention

The present invention relates to an analysis of ordinary data such as measurement data of a physical object, such as an industrial plant, an experiment, or a natural phenomenon.

2. Description of the Related Art

Time series data include measurement data of an industrial plant, chemical plant, or the like, data obtained by observation of nature such as a meteorological observation, observation data of a social phenomenon such as vital statistics, measurement data of an economical phenomenon such as a variation of stock prices, and so forth.

Widely known techniques for analyzing these time series data include techniques of a multivariate analysis such as multiple regression analysis, correlation analysis, and principal component analysis, and techniques of a frequency component analysis by Fourier transform. Meanwhile, in the field of pattern recognition, a technique called DP matching, wherein ordering is performed efficiently for one-dimensional patterns such as time series patterns, and wherein the degree of similarity between the patterns is detected based on the well-ordered patterns, is described in Y. Uesaka et al, *"Pattern Recognition and Learning Algorithm"*, pp. 91–104; and (collectively referred to below as Prior Art 1).

A technique which facilitates pattern recognition processing of time series data is symbolization. This technique applies a two-dimensional characteristic extraction filter to a time series variation pattern to extract characteristic amounts representing a variation of the time series data. By dividing the time series data at the characteristic point, a polygonal vector which maintains a characteristic in variation of the original data can be obtained (Prior Art 2). An example of an application of time series data symbolization is presented in *Hitachi Review*, August 1991, pp. 47–52.

Further, techniques for extracting knowledge from a large amount of data include statistical techniques such as correlation analysis, principal component analysis, multiple regression analysis, and, recently, a new technique called data mining (Prior Art 3). The latter technique automatically extracts hidden information from a large amount of raw data. An outline is described in Christopher J. Matheus, et al., "Systems for Knowledge Discovery in Databases", *IEEE Trans. on Knowledge and Data Engineering*, Vol. 5, No. 6, Dec. 1993, pp. 903–913.

With Prior Art 1, it is possible to extract a single amount while paying attention to a certain characteristic of time series data, or to perform a quantitative analysis based on the value of the single amount. However, it is difficult to analyze a relationship among a large number of series. Further, when describing a cause to a result with data itself, it is necessary to specify the portion in all data and to analyze the structure of the specified data. However, Prior Art 1 does not directly provide means for structurally analyzing such data. Further, since special knowledge is essentially required for interpretation of a result of an analysis of Prior Art 1, it cannot be used by one who does not possess such special knowledge.

Prior Art 2 is a technique for extracting a variation amount of time series data as a symbol, but does not provide means for grasping a relationship between symbols or for analyzing a relationship among a plurality of series. Further, Prior Art 2 does not provide a form in which extracted symbolized data are stored, or utilization means when data are accumulated by a large amount.

In Prior Art 3, particularly for data whose structure is defined as a list or a relationship, an attribute value which relates to a conclusion is extracted by a technique of inductive learning. However, since Prior Art 3 does not consider a temporal causal relation as a relationship between attributes, and further because Prior Art 3 is directed to processing of attributes of symbols, it cannot efficiently handle time series data which have continuous values. Further, in Prior Art 3, since the interpretation of an extracted characteristic is entrusted to a utilizer, although a display system for helping understanding of the data structure is essentially required, a function of displaying the relationship between a characteristic extracted from time series data and the data in an easily recognizable form has not been investigated.

SUMMARY OF THE INVENTION

In a first preferred embodiment of the present invention, the data analysis apparatus includes means for symbolizing time series data, means for adding data production times to the symbolized time series data, and means for storing the symbolized data, to which the data production times have been added, as record data. By symbolizing and storing time series data as record data, the required accumulation amount can be reduced while maintaining the characteristic, and retrieval processing by a computer is facilitated.

In a second preferred embodiment of the present invention, the data analysis apparatus includes means for adding data production times to symbolized time series data and storing them as record data, means for retrieving the stored symbolized data, means for constructing a partial aggregate of the data as cases using time information of the record data found as a result of the retrieval, means for inputting a designation of the case construction, means for classifying the cases into one or more classes, means for inputting a designation of the classes, means for extracting models describing the classes using the data included in the cases in the classes, and means for outputting the result of the analysis. By storing symbolized data as records, since the embodiment has the means for designating a time relationship between symbol values as a case and the means for retrieving the stored data efficiently, the time relationship between the symbol values can be extracted from the data.

In a third preferred embodiment of the present invention, the data analysis apparatus includes means for adding data production times to symbolized time series data and storing them as record data, means for retrieving the stored symbolized data, means for constructing a partial aggregate of the data as cases using time information of the record data found as a result of the retrieval, means for inputting a designation of the case construction, means for classifying the cases into one or more classes, means for performing an analysis of the data for each class based on the cases, means for storing the result of the analysis, means for analyzing the result of the analysis of the data, and means for displaying the result of the analysis of the data. According to this third embodiment, which includes means for storing information regarding a designation of a case and means for retrieving a time relationship between cases and symbol values, the time relationship between the rules and the cases can be displayed.

BRIEF DESCRIPTION OF THE DRAWINGS

FIG. 3 shows an example of a dictionary for data symbolization;

FIG. 4 shows an example of a storage format of symbolized time series data;

FIG. 7 shows an example of a storage format of symbolized time series data;

FIG. 8 shows an example of a result of an analysis of data;

FIGS. 12(a) and 12(b) show an example of storage of an output of the data analysis apparatus;

FIG. 13 shows an example of an output of the data analysis apparatus;

DETAILED DESCRIPTION OF THE PREFERRED EMBODIMENTS

The present invention is applied in conjunction with a computer having a compiler, which in a preferred embodiment is constituted by a combination of software (stored on a storage medium such as a hard disk or other storage device) and hardware (such as a central processing unit) that executes the software to perform the function of the compiler, wherein the compiler operates on the central processing unit and reads source code from an external memory, converts it into an object code, and then stores the object code into an external memory.

Figure 1:
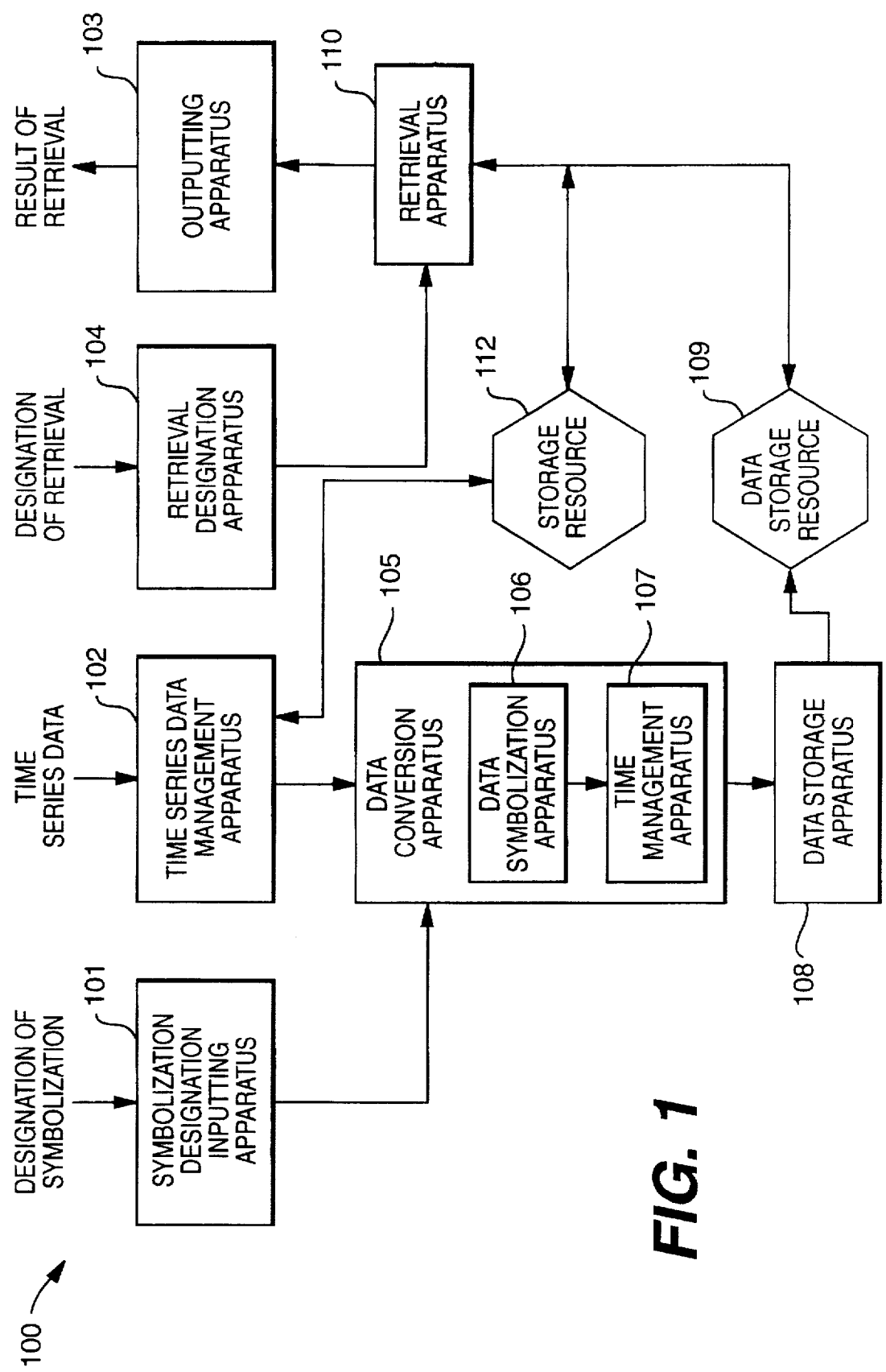
FIG. 1 is a view of an entire data management apparatus for storing symbolized data.

A first embodiment of the present invention will be described below with reference to the drawings. FIG. 1 shows a construction of a symbolized data management apparatus 100 and flow of data therethrough. Input data to a symbolized data management apparatus 101 are provided to a time series data management apparatus 102. The input data include a measurement value and a time at which the measurement value occurred, as seen in FIG. 2(b). In the present invention, time series data need not necessarily be stored. However, for convenience of description, it is assumed that input data are stored into a storage resource 112 by the time series data management apparatus 102.

The input data are supplied to a data conversion apparatus 105, in which a data symbolization apparatus 106 is activated. The data symbolization apparatus 106 converts the input data into a symbol value with reference to a symbolizing dictionary 300 (FIG. 3) which stores variation patterns, and outputs a similarity degree representing a degree of similarity of the input data to the most similar variation pattern registered in the symbolizing dictionary 300.

A time management apparatus 107 outputs a start time and an end time of the variation pattern detected by the data symbolization apparatus 106. The data conversion apparatus 105 outputs the start time, the end time, the symbol value, and the similarity degree to a data storage apparatus 108 for each conversion, and the data storage apparatus 108 stores the input data into a data storage resource 109 as a record formed from fields of the start time, the end time, the symbol value, and the similarity degree.

Figure 2A:
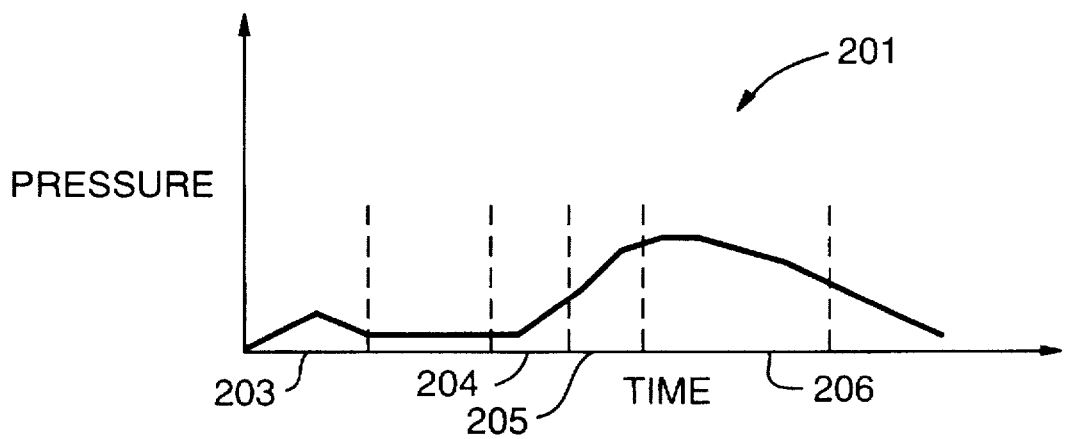
FIGS. 2(a) and 2(b) show an example of time series data.
Figure 2B:
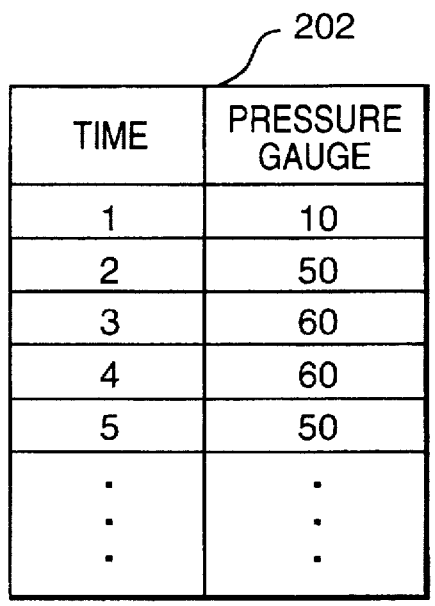

FIGS. 2(a) and 2(b) illustrate an example of conversion object data. Time series data 201 are gathered by a pressure gauge installed in a chemical plant, and data 202 illustrate sampling of the time series data 201 to obtain measurement values of the pressure gauge at one second intervals.

FIG. 3 shows a symbolizing dictionary 300, in which a correspondence relationship between analysis object data and a symbol value is stored. The symbolizing dictionary 300 is prepared in advance by a utilizer in accordance with an object of an analysis. A field 301 is for a variation pattern of time series data which make an object of symbolization, and a field 302 is for a symbol value corresponding to a variation pattern of the field 301.

FIG. 4 shows a storage format 400 of the symbolized data management apparatus 100. A field 401 includes times at which particular variation patterns occurred; a field 402 stores symbol values obtained by conversion; and a field 403 contains similarity degrees with which the similarity between particular input data and a particular variation pattern registered in the symbolizing dictionary 300 is evaluated. The storage format 400 is stored into the data storage resource 109 by the data storage apparatus 108.

Returning to FIG. 1, a field value establishing a retrieval key as a designation of retrieval is input to a retrieval designation apparatus 104. A retrieval apparatus 110 retrieves records which satisfy the retrieval key from within the data storage resource 109 and supplies the result of the retrieval to the outputting apparatus 103. Consequently, the outputting apparatus 103 outputs the result of retrieval.

A characterizing feature of the first embodiment is the data conversion apparatus 105, including the data symbolization apparatus 106 and the time management apparatus 107, converts time series data into data of a format with which retrieval by a computer can be performed readily, and sequentially processes data on a real time basis.

In the following, details of the present embodiment will be described with reference to FIGS. 1–4.

Time series data 201 are input timewise in the format of the data 202 to the time series data management apparatus 102. After data in an interval 203 are input, the data conversion apparatus 105 collates the data in the interval 203 and the symbolizing dictionary 300 by means of the data symbolization apparatus 106, to obtain the pattern 302 and the similarity degree 0.4. The time management apparatus 107 receives the data in the interval 203 and the result of collation of the data conversion apparatus 105, and calculates a start time and an end time of the pattern obtained. The data conversion apparatus 105 outputs 0, 50, "rises and drops", and 0.4 as the start time, the end time, the conforming symbol value, and the similarity degree, respectively, for the interval 203. The data storage apparatus 108 stores 0, 50, "rises and drops", and 0.4 into the data storage resource 109, as data of a single record. The intervals 204, 205, and 206 are processed in a similar manner. Consequently, data 400 are obtained.

The management of the time series data in the storage format of the data 400 allows processing by a spreadsheet application, data base software, or the like. It is assumed that the retrieval designation apparatus 104 and the retrieval apparatus 110 are spreadsheet applications.

When it is known that an abnormal condition of a chemical plant occurred at the "begins to rise" of pressure data, if it is desired to perform an analysis as to the abnormal condition-occurrence time, "symbol value="begins to rise"" is provided to the retrieval designation apparatus 104. Consequently, the retrieval apparatus 110 extracts a record 405, and the outputting apparatus 103 outputs the record 405.

By removing redundancy of data by symbolizing time series data and storing a symbol value and a time at which the data was generated in the form of a record in this manner, retrieval processing by a computer is facilitated. Accordingly, object data can be searched in a short time from within a large amount of time series data.

Figure 5:
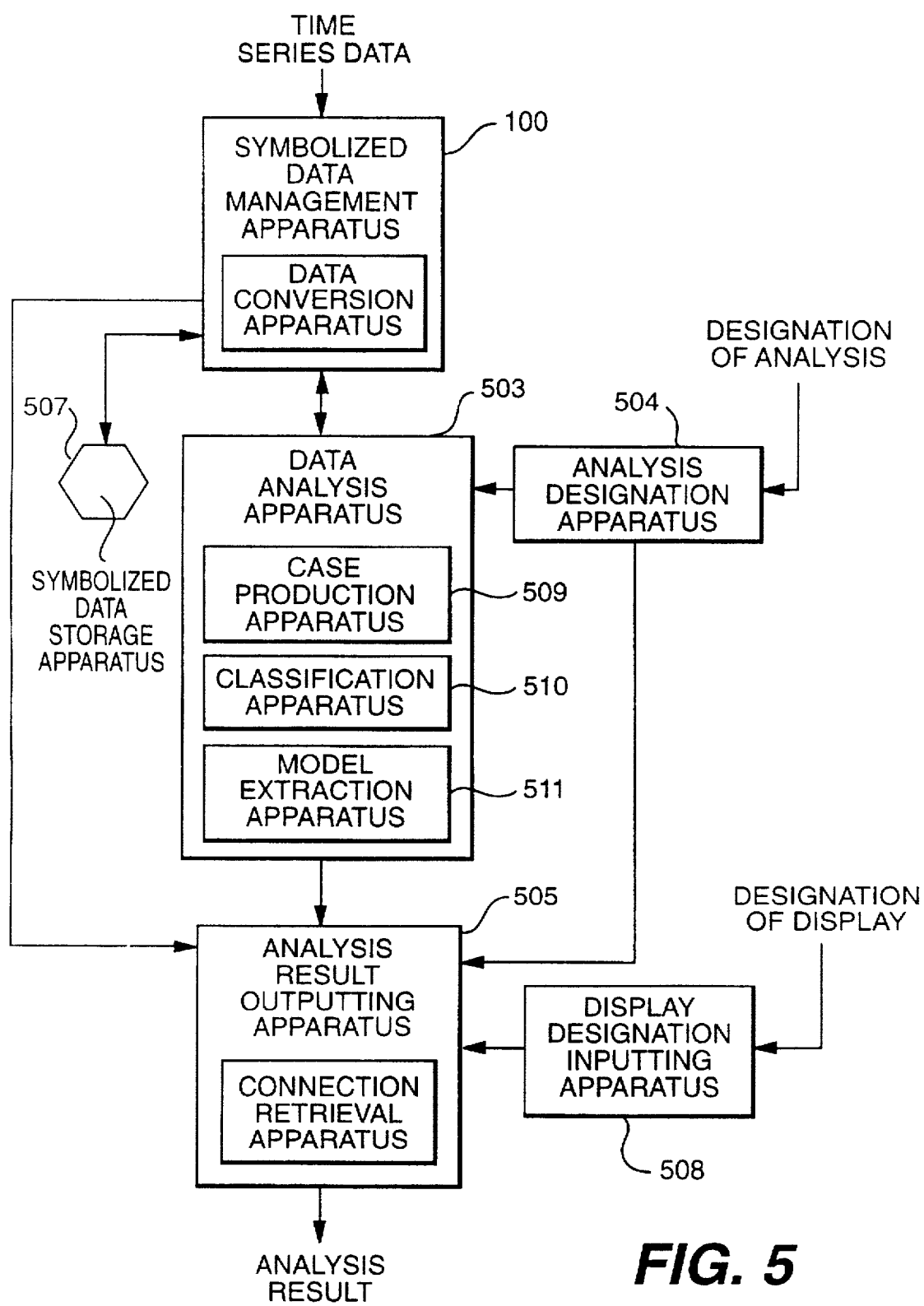
FIG. 5 is a view of an entire data analysis apparatus in which a symbolized data management apparatus is employed.

Next, a second embodiment of the present invention will be described. Referring to FIG. 5, a data analysis apparatus 503 issues a retrieval request to the symbolized data management apparatus 100 in accordance with a designation of an analysis designation apparatus 504. The symbolized data management apparatus 100 retrieves the requested symbolized data from a symbolized data storage apparatus 507 and delivers the requested data to the data analysis apparatus 503, which then performs an analysis of data using the results of the retrieval.

Within the data analysis apparatus 503, a case production apparatus 509 discriminates a case in which the result of retrieval is included, a classification apparatus 510 discriminates to which class the case which includes the result of retrieval belongs, and a model extraction apparatus 511 constructs a model representing a data structure using the case information and the class information. An analysis result outputting apparatus 505 outputs the rule obtained by the data analysis apparatus 503 based on a designation of display input from a display designation inputting apparatus 508. The data conversion apparatus 105 receives the results of the analysis from the retrieval designation apparatus 104 and displays the results in accordance with a designation of the data storage apparatus 108.

Figure 9:
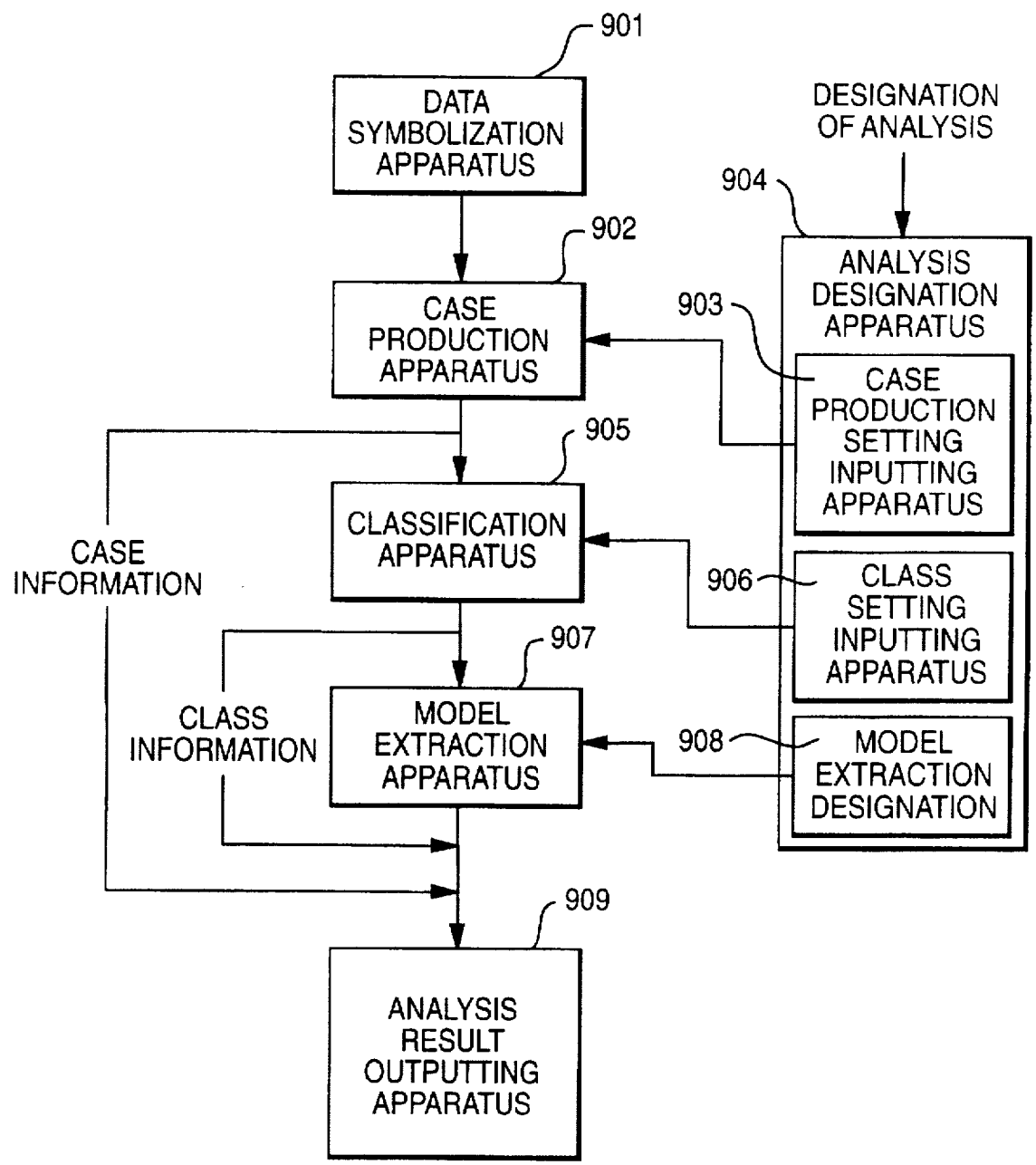
FIG. 9 is a detailed view of the data analysis apparatus.

In this second embodiment, the data analysis apparatus is characterized in that time series data are stored as an aggregate of records by the symbolized data management apparatus 100, and cases are produced from the time series data by the case production apparatus 509, whereupon the aggregate of the cases is divided into classes by the classification apparatus 510, and then a character is extracted from the time series data as a model describing the object data by the model extraction apparatus 511. The symbolized data management apparatus 100 is similar to the apparatus 100 in FIG. 1. Further, FIG. 9 shows details of the data analysis apparatus 503.

Figure 6:
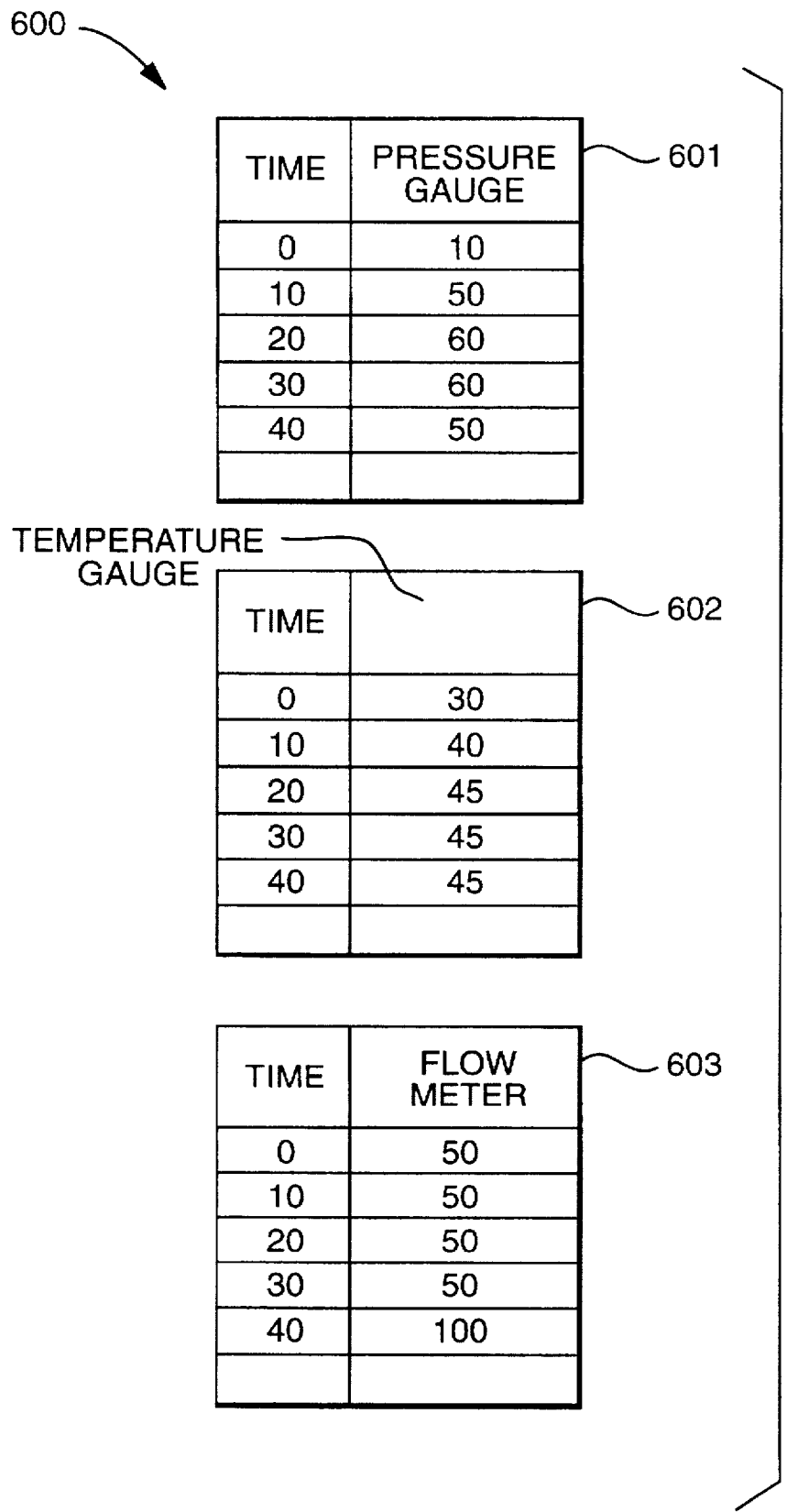
FIG. 6 shows an example of time series data.

FIG. 6 illustrates examples of analysis object data. Similarly to the time series data 201, time series data 600 are gathered by measuring equipment installed in a chemical plant. Each datum is obtained by sampling a the time series data every 10 seconds. Data 601 are obtained by sampling the data of a pressure gauge, data 602 are obtained by sampling the data of a temperature gauge, and data 603 are obtained by sampling the data of a flow meter.

FIG. 7 shows an example of data stored by the symbolized data management apparatus 100. Data 701 represent the result of conversion of the data 601, data 702 represent the result of conversion of the data 602, and data 703 represent the result of conversion of the data 603. While these symbolized data are represented as aggregates of records formed from fields of the time, the symbol value, and the similarity degree, the fields of the symbol value and the similarity degree may each be provided by plural entries in a juxtaposed relationship in the records. This corresponds to a case wherein time series data at an instance can be symbolized by a plurality of symbols.

Further, the aggregates of records of symbolized data need not necessarily be prepared as files for individual measuring instruments, and the sampling periods of the individual time series data need not necessarily be equal to each other. In the present embodiment, however, for convenience of description, a file for storing an aggregate of records is prepared for each measuring instrument, and the sampling periods of the measuring instruments are equal to each other.

FIG. 8 shows an example of an analysis result. The analysis result is output as a condition for the introduction of a conclusion in the form of an if-then rule. In the present embodiment, a model representing a data structure denotes an aggregate of rules for each class. The "if symbolized pattern name" is the conditional portion of a rule, and the number of conditional nodes included in the conditional portion is one or more. The "then class name" is the conclusional portion of a rule.

An analysis 800 represents a data structure for determination of an abnormal condition based upon certain conditions occurring within a one-minute time period. A rule 801 signifies that the temperature rises, a rule 802 signifies that the temperature rises first and then drops as pressure rises, and a rule 803 signifies that the flow rate begins to drop and the pressure rises.

In the following, details of the present embodiment will be described with reference to FIGS. 5 and 9, which shows details of FIG. 5.

First, a user performs designation of production of cases and setting of classes by means of the analysis designation apparatus 504(904) (in particular, by means of a case production setting inputting apparatus 903 and a class setting inputting apparatus 906). Here, a case signifies an aggregate of data representing a certain representation in the real world. What constitutes a case differs depending upon the viewpoint of a user.

A class signifies a unit for classification of cases; for example, two classes (normal cases and abnormal cases) are designated. This class designation is not essential, and where there is no necessity of classifying cases into a plurality of classes, the succeeding processing is continued under the assumption that all cases belong to one class.

In the present embodiment, an aggregate of symbolized patterns obtained from measurement instrument data for 10 seconds before the plant enters into an abnormal condition is regarded as a case, and those cases are determined to belong to an abnormal class. Further, a time during which no abnormal condition occurs is selected at random, and an aggregate of symbolized patterns up to the time 10 seconds prior to the selected time is determined to be a normal case. Thus, the class to which those cases belong is referred to as a normal class. Further, the numbers of cases included in the individual classes are equal to each other.

The analysis designation apparatus 504(904) designates a class for which a rule is to be extracted and a parameter to be given for extraction of a rule. Here, three indices indicating a degree of good quality of a rule are introduced. The ratio A/N between a number A of cases which include a symbolized pattern of the conditional portion and the total case number N is employed as the first index, called the "cover ratio". The cover ratio is a probability index (e.g., p(x)) representative of a generality of the rule, and as the cover ratio increases, the rule is more general (explains a greater number of cases). On the contrary, as the cover ratio decreases, the rule is a more special (explains a smaller number of cases).

Further, the ratio B/A, where B is an in-class case number including the symbolized pattern of the conditional portion included in a certain class, is used as the second index, called "accuracy". The accuracy represents a ratio (e.g., p(y|x), or more precisely, p(y|x)/p(y)) of the number of cases which conform properly with the conclusion portion to the number of cases which conform to the conditional portion. In other words, the accuracy is an index indicating the probability that the rule holds true, and it can be said that, as the accuracy increases, the condition is more peculiar to the class. Generally, since there is a tendency for the accuracy to decrease as the cover ratio of a rule increases, the satisfaction of cover ratio and accuracy, or the preferential degree between the cover ratio and the accuracy or the like, is designated as a parameter.

Further, each symbolized pattern in the cases has a conformity degree representing the degree of similarity with original data, or degree of "confidence" a pattern has. The conformity is a measure of matching; if large, then the pattern is reliable. Thus, an average of conformity degrees of symbolized patterns of the conditional portion in cases which include symbolized patterns of the conditional portion is used as an index indicating the degree of good quality of the conditional portion itself of the rule, and this is called the "average conformity degree". In the present embodiment, when a rule is extracted, the degree of good quality of the rule is evaluated in accordance with the three indices of the cover ratio, the accuracy, and the average conformity degree.

The case production apparatus 509(902) searches for cases from among data stored in the symbolized data management apparatus 100(901), and performs calculations to detect the symbol values included in the individual cases. The classification apparatus 510(905) discriminates the class of each searched case, and extracts a rule representative of a data structure of the class designated for analysis by the model extraction apparatus 511(907) (based on a designation received illustratively from a model extraction designation apparatus 908). The analysis result outputting apparatus 505(909) then outputs the rule obtained by the data analysis apparatus 503.

Figure 10:
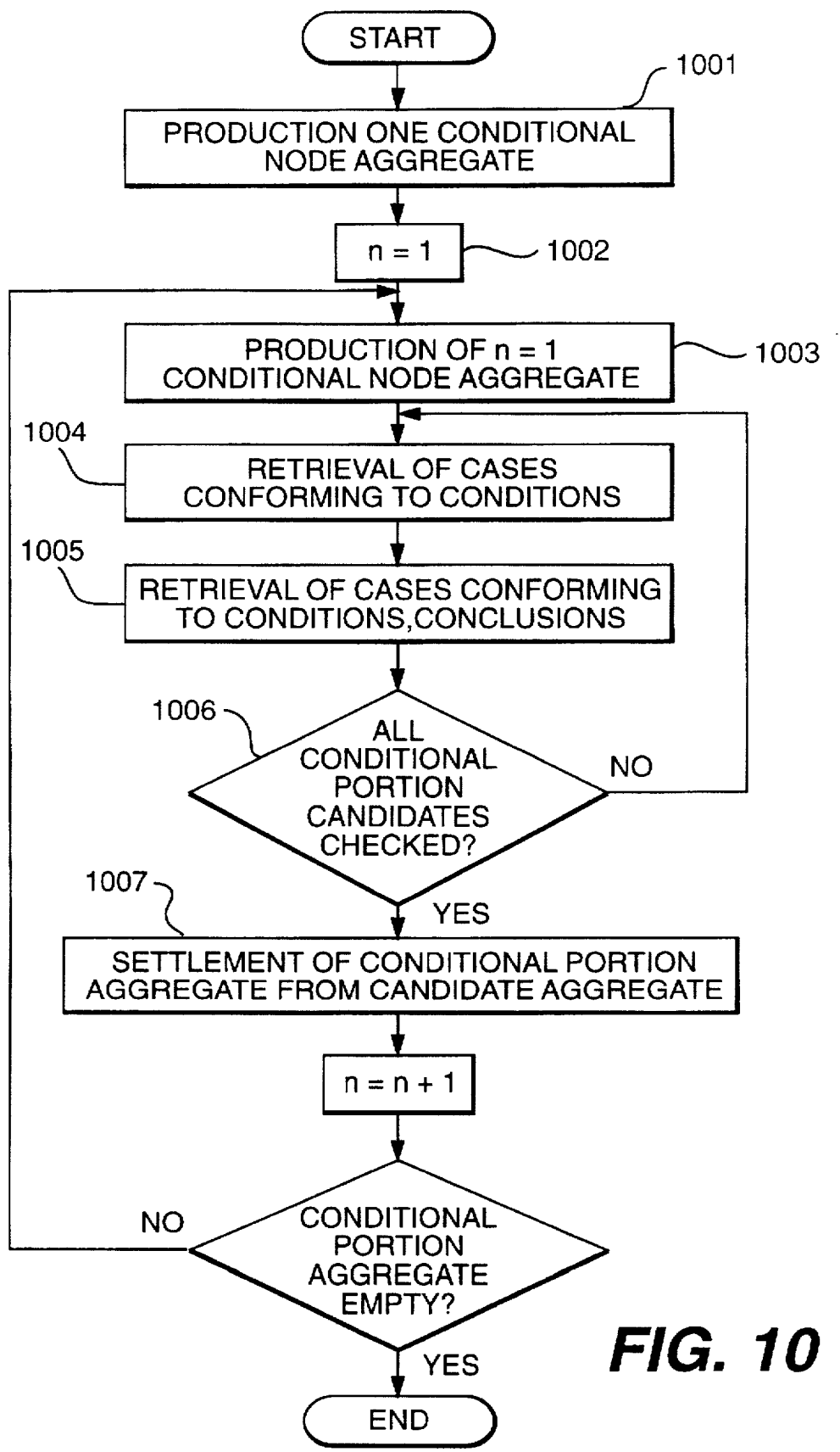
FIG. 10 is a flow chart of data analysis processing.

FIG. 10 illustrates details of the analysis processing performed by the apparatus of FIG. 9. In an outline of the processing, construction of a candidate rule aggregate of the n+1 condition node from the rule of the n condition code, and production of a rule of the n+1 condition node from within the candidate rule aggregate, are repeated. First, at step 1001, a rule 1 condition code aggregate is produced. More particularly, the cover ratio, the accuracy, and the average conformity degree, when a single symbol value is applied to the condition node, are calculated, and those which exceed references set by the analysis designation are adopted as a rule.

At step 1002, n is set to n=1, and searching begins for a rule of the multiple condition node. At step 1003, an n+1 condition node candidate aggregate is produced by adding a symbolized pattern name to the n condition node aggregate, and those symbolized pattern names which were abandoned at the preceding iteration steps are not included in candidates from the beginning. For example, when all symbolized pattern names are {a, b, c} and the one condition node aggregate obtained by step 1001 is {a, b}, the n+1 condition node candidate aggregate is {{a, b}, {b, c}, {c, a}}.

At step 1004, for each of the factors of the n+1 condition node candidate aggregate, the number of cases including the condition node are calculated. At step 1005, for each of the factors of the n+1 condition node candidate aggregate, the number of cases which belong to the class which includes the condition node and makes an object of extraction of a model are calculated. After the processing at steps 1003 to 1005 is repeated for all of the factors of the n+1 condition node candidate aggregate (step 1006), the processing advances to step 1007. At step 1007, the n+1 condition node rule is settled in accordance with the reference decided at step 1005.

By handling time series data as records by the symbolized data management apparatus 100 and producing cases based on time information using the case production apparatus 509 in this manner, a data structure model which can be understood readily by a utilizer can be extracted from the time series data.

Figure 11:
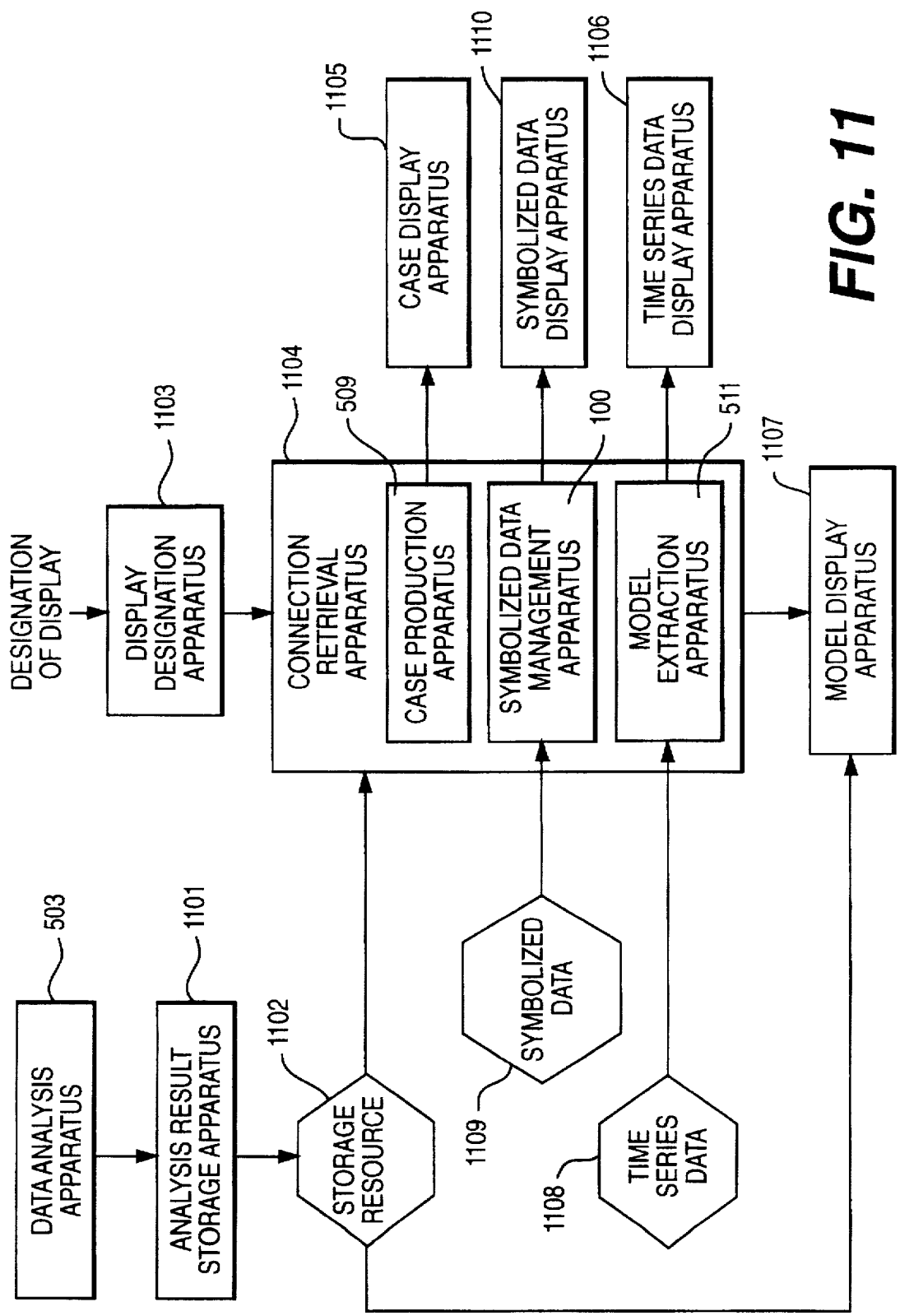
FIG. 11 is a view of an entire display section of the data analysis apparatus.

In the following, a third embodiment of the present invention will be described. Referring to FIG. 11, analysis results obtained by the data analysis apparatus 503 are accumulated into a storage resource 1102 by an analysis result storage apparatus 1101. A utilizer selects a rule and a case to be displayed from a display designation apparatus 1103. In accordance with a demand from a display designation apparatus 1103, a connection retrieval apparatus 1104 searches for the rule, the case, and a connection between the time series data from an analysis result stored in the storage resource 1102. Then, the searched rule, case, symbolized data, time series data, and connection between them are output from the respective display apparatus.

The case production apparatus 509, classification apparatus 510, model extraction apparatus 511 (which receives time series data from a storage 1108), and data analysis apparatus 503 are similar to corresponding elements of the apparatus shown in FIG. 5. Further, the symbolized data management apparatus 100 (which receives symbolized data from a storage 1109) is similar to that shown in FIG. 1.

In the third embodiment, the data analysis apparatus is characterized by the storage of time series data as symbolized values using the symbolized data management apparatus 100, and by the analysis of the stored symbolized data by case, using the data analysis apparatus 503, whereupon the temporal relationship between the cases and the rules are analyzed by the connection retrieval apparatus 1104 to make it possible to display the variation of the temporal structure of the time series data. Details of the present embodiment will be described below with further reference to FIGS. 11–13.

If a user requests a display of a table of rules by way of the display designation apparatus 1103, then a model display apparatus 1107 displays a table of rules, such as that shown in FIG. 13, using stored data 1202 (FIG. 12(b)). Analysis results are stored in the analysis result storage apparatus 1101 in a format such as that shown in FIG. 12(b). In FIG. 12(a), reference numeral 1201 denotes a description regarding an object of the analysis. A case definition indicates a reference constructing a case, a class definition indicates a reference of a class for which the analysis is performed, and a rule number indicates the total number of extracted rules. Reference numeral 1202 indicates the conditional portion of the extracted rule, the cover ratio, the accuracy, the average conformity degree, and the evaluated value.

If a request for a delay of the temporal relationship between the rules and the cases is input by way of the display designation apparatus 1103, then information of the rule conditional portion, the case definitions, and the class definitions in the storage data 1202 are provided as retrieval conditions to the symbolized data management apparatus 100 so that those cases which conform to only the rule conditions and those cases which conform to the entire rule conditions are searched.

The results of the search may be sent to a case display apparatus 1105, which provides the display shown in FIG.

14. The axis of abscissa 1402 indicates the time axis, and the cases appear in order of their generation. Further, the rules are arranged on the axis of ordinate 1401.

The following methods (1) to (3) are available to arrange the rules:

(1) A method wherein an order relationship is defined in the conditional node, and the rules are arranged in accordance with their order of the dictionary in the conditional portion.

(2) A method wherein the rules are sequenced based on each of the cover ratio, the accuracy, and the average conformity degree thereof.

(3) A method wherein the rules are sequenced based on an evaluation expression which considers all of the cover ratio, the accuracy, and the average conformity degree.

While these methods can be employed to arrange the rules, here, for convenience of description, it is assumed that the rules are arranged in order of evaluated value. Thus, FIG. 14 can be used to determine a relationship between the rule aggregation and the case aggregation. Reference numeral 1404 denotes an instance wherein both of the conditional portion and the conclusion portion conform to a case, and reference numeral 1405 denotes another instance wherein only the conditional portion of a rule conforms to a case. Further, reference numeral 1406 denotes an instance wherein a case belongs to a case class from which a rule has been extracted but does not conform to any rule. Thus, it can be seen that a case A conforms to the rules 3, 4, and 5, and cases C and D conform to the rules 2 and 3. It can also be seen that, although the rule 5 conforms to a case which has occurred at an early point of time, it does not conform to a later case, and the occurrence pattern of an abnormal condition varies as time passes.

Figure 14:
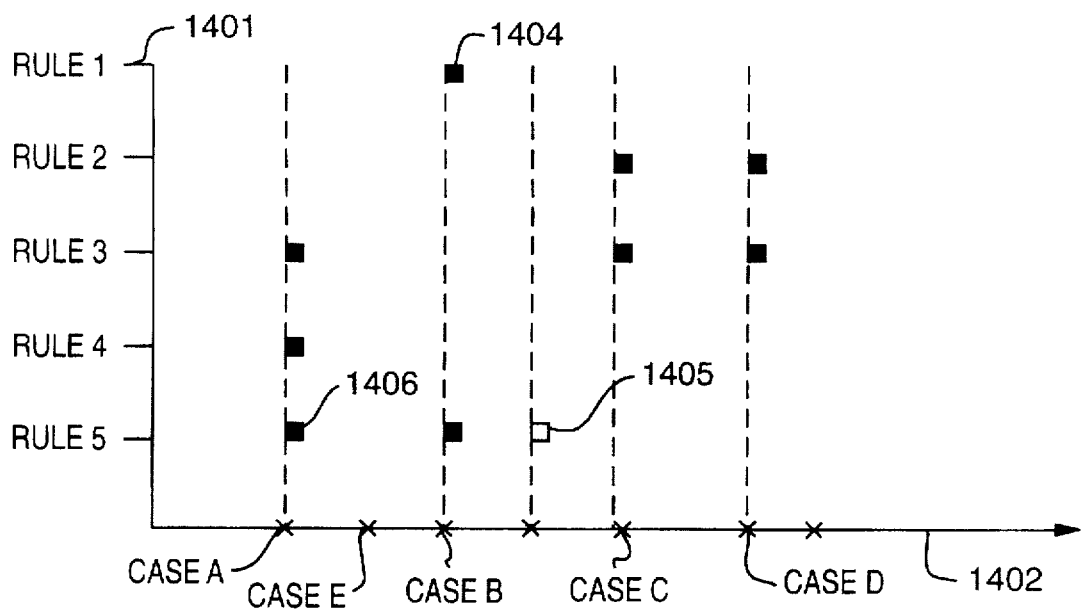
FIG. 14 shows an example of a display of a relationship between rules and cases.

When a model of time series data based on an aggregate of rules is represented in this manner, the case aggregate and the rule aggregate are in a surjection relationship (that is, a single case includes several strong characteristics). By plotting the relationship between the rules and the cases on a plane constructed as shown in FIG. 14, a user can grasp information regarding characteristics included in the cases and the occurrence times of the cases and so forth.

If a user inputs a detailed display request of the rule 3 by means of the analysis result storage apparatus 1101, then the rule conditional portion, the case definitions, and the class definition information in the storage data 1202 are supplied as retrieval conditions to the symbolized data management apparatus 100, by which cases which conform to both of the rule conditional portion and the conclusion portion are searched. Further, a result of the search is supplied to a time series data display apparatus 1106, by which those time series data which correspond in time to the symbolized data (which may be displayed on a symbolized data display apparatus 1110) are searched.

Figure 15:
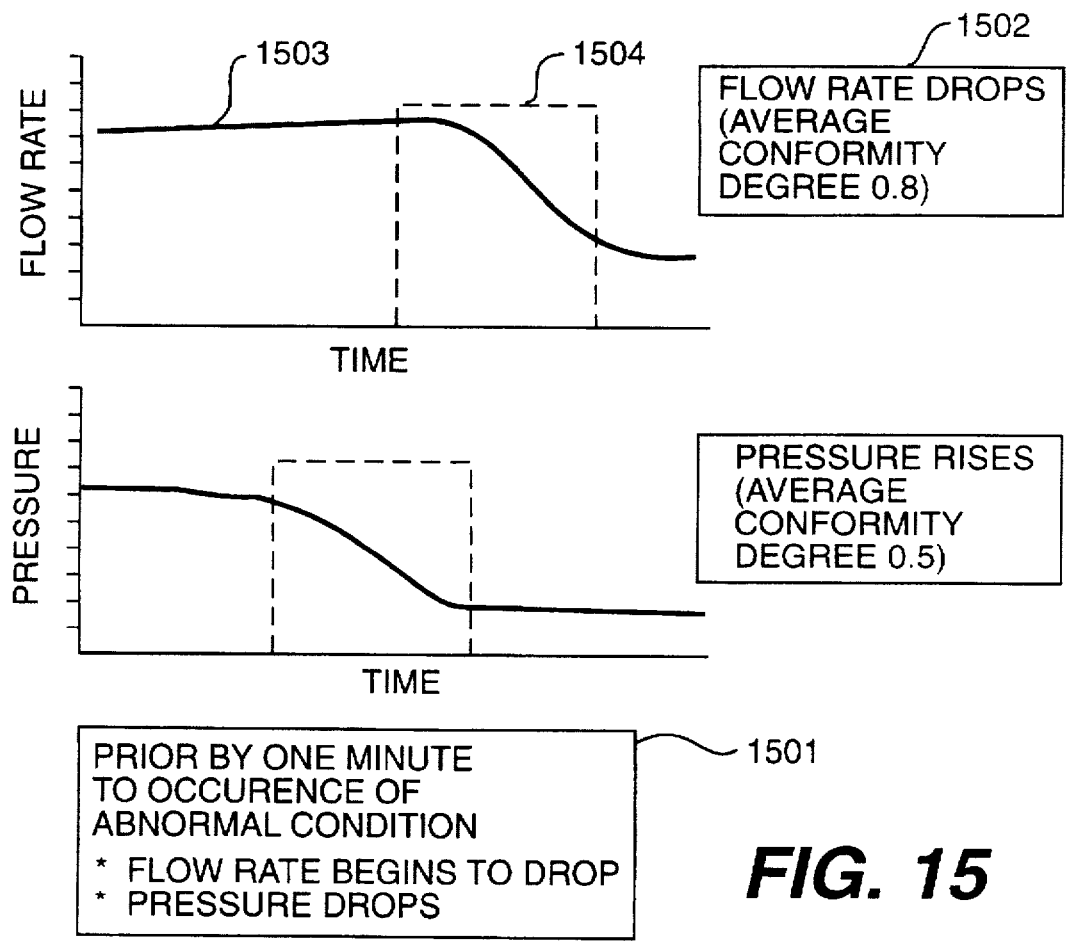
FIG. 15 shows an example of a display of symbolized data, time series data, and a rule mapped to case information.

An example wherein the cases which conform to the rule 3 and time series data which conform to the cases are displayed is shown in FIG. 15. Reference numeral 1501 denotes a rule which has made an object of the detailed display, reference numeral 1502 denotes a conditional portion of the rule, reference numeral 1503 denotes time series data corresponding to the cases, and reference numeral 1504 denotes a rule conforming portion in the cases.

As described above, according to the present invention, by symbolizing time series data and storing them together with production times of the data, retrieval processing of the data by a computer is facilitated, and, by performing an analysis by case using the data production times added to the symbol values, also for a plurality of time series data, a causal relation between different series can be provided to a user in the form of a rule representing a data structure. Further, by displaying a temporal relationship of extracted rules and cases, means for grasping a plurality of characteristics of the cases and means for observing a temporal structure of the data by case can be provided.

Various embodiments of the invention have been described above. However, the person of ordinary skill in the field to which the present invention pertains will readily note modifications to the disclosed embodiments. All such modifications that rely on the teachings through which the invention has advanced the state of the art are properly considered within the spirit and scope of the invention.

We claim:

1. A data analysis apparatus, comprising:

means for inputting time series data;

means for storing symbolization references and symbol values having a correspondence to values of the input time series data;

means for converting the time series data into at least one symbol value in accordance with the stored symbolization references; and means for storing record data formed from the symbol values obtained by the means for converting and times at which the time series data were produced.

2. A data analysis apparatus according to claim 1, wherein said means for storing stores as the record data the symbol values obtained by the conversion of the symbol values and times at which the corresponding time series data were produced.

3. A data analysis apparatus, comprising:

means for inputting time series data;

means for inputting symbolization references and symbol values having a correspondence to values of the time series data;

means for converting, in accordance with the input symbolization references, the corresponding time series data into at least one symbol value;

means for storing the symbol values obtained by the means for converting and the time series data corresponding to the symbol values with a correlation condition; and means for retrieving the stored time series data using the symbol values.

4. A data analysis apparatus according to claim 3, further comprising means for outputting a rule of if-then format using the symbol values in the record data.

5. A data analysis apparatus according to claim 4, wherein a combination relationship of the symbol values in the record data constitutes a conditional portion of the rule of if-then format.

6. A data analysis apparatus according to claim 4, wherein an orderly relationship of the symbol values in the record data constitutes a conditional portion of the rule of if-then format.

7. A data analysis apparatus according to claim 4, wherein the input time series data include a temporal attribute, and wherein said means for retrieving retrieves the time series data using the temporal attribute.

8. A data analysis apparatus according to claim 3, further comprising means for outputting a result as a rule of if-then format, wherein a combination relationship of the symbol values in the record data constitutes a conditional portion of the rule of if-then format.

9. A data analysis apparatus according to claim 3, further comprising means for outputting a rule of if-then format, wherein an orderly relationship of the symbol values in the record data constitutes a conditional portion of the rule of if-then format.

10. A data analysis apparatus according to claim 3, wherein the input time series data include a temporal attribute, and wherein said means for retrieving retrieves the time series data using the temporal attribute.

11. A computer-readable storage medium encoded with executable instructions constituting a program for analyzing time series data, wherein the program, when executed by a computer, causes the computer to perform a method comprising the following steps:

converting time series data into at least one symbol value in accordance with a plurality of symbolization references; and producing record data from the symbol values obtained by the converting step and times at which the time series data were produced.

12. A computer-readable storage medium encoded with executable instructions constituting a program for analyzing time series data, wherein the program, when executed by a computer, causes the computer to perform a method comprising the following steps:

converting, in accordance with input symbolization references, time series data corresponding to the input symbolization references into at least one symbol value;

correlating the symbol values and the time series data; and producing record data including the time series data using the symbol values.

13. A computer-readable storage medium according to claim 12, wherein the program further causes the computer to produce a rule of if-then format using the symbol values in the record data.

14. A computer-readable storage medium according to claim 13, wherein a combination relationship of the symbol values in the record data constitutes a conditional portion of the rule of if-then format.

15. A computer-readable storage medium according to claim 13, wherein an orderly relationship of the symbol values in the record data constitutes a conditional portion of the rule of if-then format.

16. A computer-readable storage medium according to claim 13, wherein the time series data include a temporal attribute, and wherein said step of producing record data produces the record data including the time series data using the temporal attribute.

17. A computer-readable storage medium according to claim 12, wherein the program further causes the computer to produce a rule of if-then format, wherein a combination relationship of the symbol values in the record data constitutes a conditional portion of the rule of if-then format.

18. A computer-readable storage medium according to claim 12, wherein the time series data include a temporal attribute, and wherein said step of producing record data produces the record data including the time series data using the temporal attribute.

* * * * *

UNITED STATES PATENT AND TRADEMARK OFFICE
CERTIFICATE OF CORRECTION

PATENT NO. : 5,802,254
DATED : September 1, 1998
INVENTOR(S) : Y. SATOU et al

It is certified that error appears in the above-indentified patent and that said Letters Patent is hereby corrected as shown below:

Title Page:   please add:

-- [30] Foreign Application Priority Data

July 21, 1995    (JP)    Japan ..........7-185298--

Signed and Sealed this

Tenth Day of November 1998

Attest:

BRUCE LEHMAN

*Attesting Officer*    *Commissioner of Patents and Trademarks*